May 2, 1967

W. N. MOSHER 3,317,226

TORQUE ARM CONNECTION

Filed May 13, 1965

INVENTOR.
WALTER N. MOSHER
BY
Huebner & Worrel
ATTORNEYS.

May 2, 1967 W. N. MOSHER 3,317,226
TORQUE ARM CONNECTION
Filed May 13, 1965 2 Sheets-Sheet 2

INVENTOR.
WALTER N. MOSHER
BY
Huebner & Worrel
ATTORNEYS.

United States Patent Office 3,317,226
Patented May 2, 1967

3,317,226
TORQUE ARM CONNECTION
Walter N. Mosher, 6137 Le Sage Ave.,
Woodland Hills, Calif. 91364
Filed May 13, 1965, Ser. No. 455,553
5 Claims. (Cl. 287—93)

This invention relates to a pivotal connection for a torque arm and more particularly to a torque arm connection especially adapted to support heavy loads.

Prior to this invention torque arm connections which were subjected to heavy loads often disintegrated when subjected to extraordinary pressure. As an example, torque arms have been used to position the rear dual axles of heavy trucks. In such vehicles interposed between the torque arm connection and a pivotally engaged bolt was a rubber insert which often was destroyed by heavy load pressure. As a result, time and money were wasted in replacing such destroyed inserts in torque arm connections.

Therefore, it is a primary object of this invention to provide a torque arm connection which can be subjected to heavy loads and high pressures without being disintegrated.

A further object of this invention is to provide an insert between a torque arm and a pivotally engaged bolt member which can be subjected to high load pressure without being destroyed.

Another object of this invention is to provide a torque arm connection which is easily installed and maintained and can withstand extraordinary load pressures without substantial deterioration.

Other objects and advantages of this invention will be apparent from the following description in conjunction with the illustrated drawings attached hereto.

Briefly, an example of a preferred form of this invention includes an insert made of rigid, compression-resistant material, which is interposed between the pivotal connection of a torque arm and an engaged bolt. It has been found that a metal, such as iron, is suitable for this purpose. The insert is made of two mating parts which are joined about the bolt and may be welded in place. The bearing surface within the insert is a cavity which conforms to the outside configuration of a portion of the bolt. The bolt and insert are designed so that the bolt can be pivoted within the cavity of the insert. The insert is fitted in a complementary hole in the torque arm so as to provide engagement between the bolt and torque arm.

Figure 1:
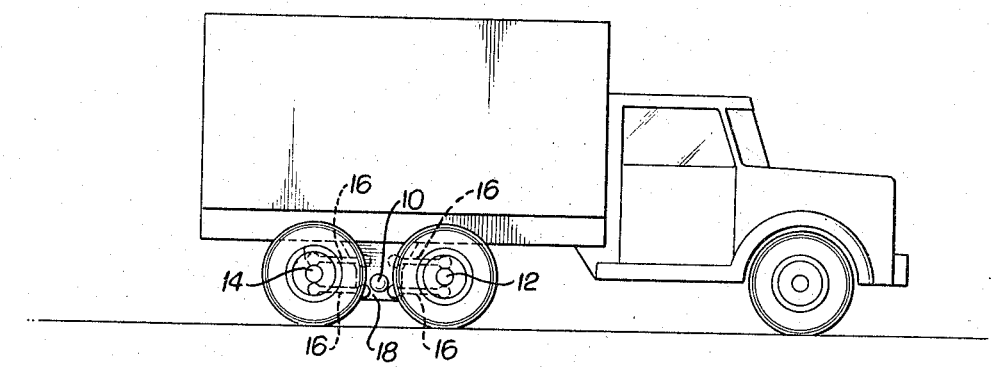
FIGURE 1 is a side elevation of a vehicle showing a typical torque arm which can be connected in accordance with this invention.
Figure 2:
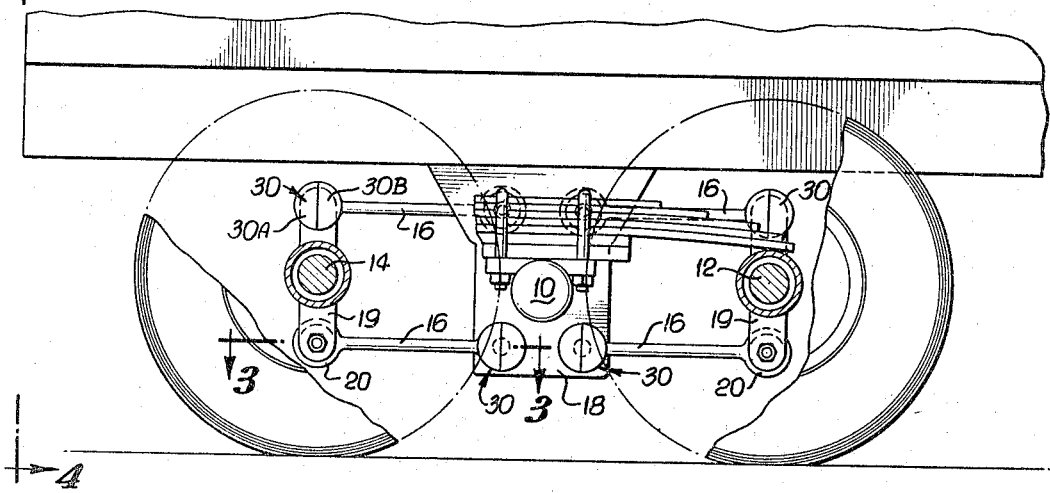
FIGURE 2 is an enlarged side elevational view of torque arms suitable for interconnection with the axles of a vehicle as shown in FIGURE 1 utilizing connections in accordance with this invention.

As illustrated in the drawings this invention is typically employed in a heavy vehicle utilizing torque arms for positioning dual rear axles as shown in FIGURES 1, 2, 4 and 5. However, torque arms of a generally similar character are employed for axle positioning in various types of vehicles and the present invention is not limited to any particular use of a torque arm.

A heavy transverse bar 10 is supported on the frame of the truck shown in FIGURE 1 intermediate the two rear axles 12 and 14. Rear axles 12 and 14 are positioned relative to the longitudinal axis of the truck by torque arms 16, each of which are pivotally connected at one end to a bracket 18 on the transverse bar 10 and at the other end to a bracket 19 on axle 12 or 14.

The torque arms 16 have enlarged ends 20 formed with cylindrical inner walls 22, the axes of which are transverse to the longitudinal axis of the torque arm. Bolts 24 having threaded ends 25 are adapted to be secured to the brackets on either the transverse bar 10 or one of the axles 12 or 14, the bolts having their longitudinal axes disposed in a transverse direction relative to the longitudinal axis of the vehicle. The other ends of the bolts 24 are formed as modified balls 26 with generally flat ends 28, so as to be barrel-shaped.

Inserts 30, made of a rigid compression-resistant material, have two mating parts 30A and 30B, and are engaged about the modified ball portions 26 of bolts 24 so as to provide a suitable bearing means between the cylindrical inner wall 22 of a torque arm and the modified ball part 26 of a bolt. The inserts 30 have body portions 32 with cylindrical outer walls that fit within openings forming cylindrical inner walls 22 of torque arms 16 and have head portions 34 which limit insertion of the inserts 30 into the cylindrical parts 22 of torque arms by abutting contact of shoulders 35 against the engaged torque arms. A cavity 36 is provided within each insert 30 for receiving the modified ball 26 of the engaged bolt.

Figure 6:
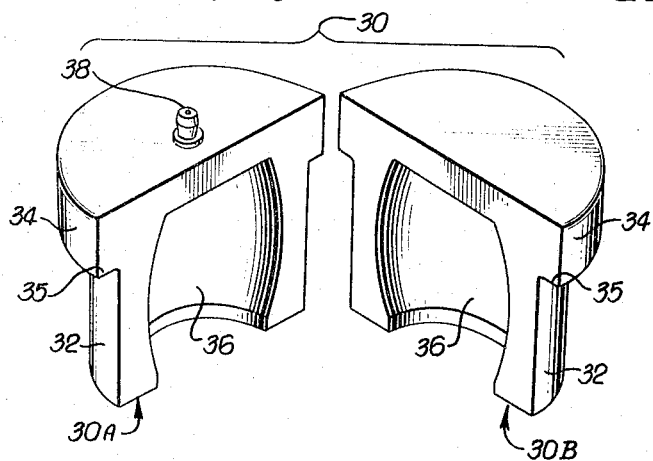
FIGURE 6 is a perspective view of the two halves of a torque arm connection insert in accordance with this invention.
Figure 7:
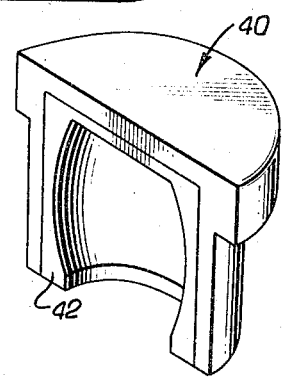
FIGURE 7 is a perspective view of one-half of the torque arm connection insert showing a modification thereof.

Cavity 36 is barrel-shaped and generally conforms to the outside configuration of the modified ball 26 and flattened end 28 of bolt 24. However, the fit between the bearing surfaces should not be so tight as to prevent pivotal movement of modified ball 26 within cavity 36. The insert shown in FIGURE 6 is provided with a grease fitting 38 which communicates with cavity 36. A space sufficient to allow grease to flow between the bearing surfaces of cavity 36 and engaged modified balls 26 of bolts 24 is provided so as to reduce friction therein. In the half of the modified insert 40 shown in FIGURE 7 bearing surface friction is reduced by providing the insert cavity with a polytetrafluoroethylene bushing 42. Otherwise this insert is the same as previously described except that since the bushing 42 provides a slippery interior cavity no provision is required for insertion of grease therein so as to reduce the friction between bearing surfaces.

Figure 3:
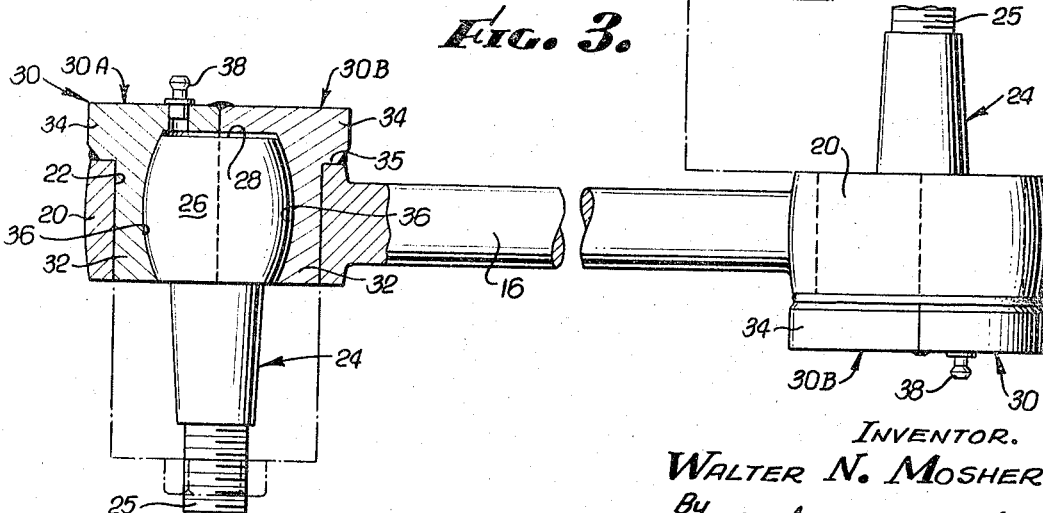
FIGURE 3 is an enlarged top elevational, partially sectional view of a torsion arm taken through 3—3 in FIGURE 2 showing the connection between the torsion arm and the bolts inserted in each end thereof.
Figure 4:
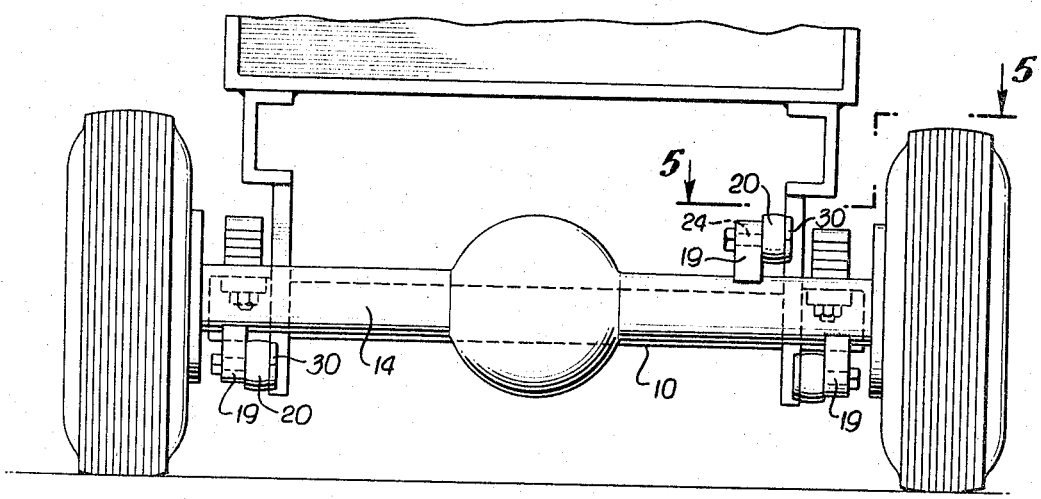
FIGURE 4 is a fragmented end elevational view of a vehicle axis using torsion arms in accordance with this invention.
Figure 5:
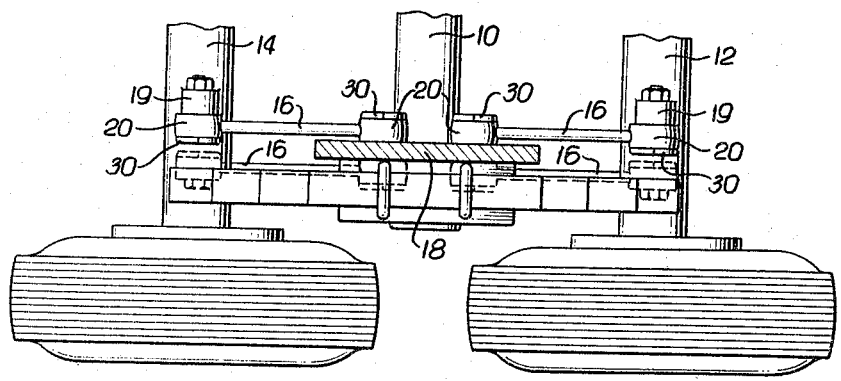
FIGURE 5 is a fragmented, top elevational, partially sectioned view of a torsion arm interconnected to a vehicle axle taken through 5—5 of FIGURE 4.

A torque arm connector as described is assembled by placing the modified ball end 26 of a bolt 24 in a cavity 36 of half of an insert 30. Then the other half of the insert 30 is engaged thereto so as to align the split halves of the insert with the bolt axis. The engaged halves of the insert 30 can be welded in place if desired. Insert body 32 is slid into an opening having a cylindrical inner wall 22 in the enlarged end 20 of a torque arm 16. It is stopped by abutment against shoulder 35 of insert head 34, and is rigidly secured to the torque arm as by the welds shown in the drawing. Preferably bolts 24 are engaged in both ends of a torsion arm 16 as shown in FIGURE 3. Then the free ends 25 of the bolts are engaged in members which are desired to be interconnected by torque arm connectors.

Thus, when used in a vehicle illustrated in FIGURES 1, 2, 4 and 5 the torque arm is pivotally engaged between a vehicle frame and an axle of the vehicle so that the torque arm is generally aligned with the longitudinal axis of the vehicle and the bolt is transversely positioned relative to the longitudinal axis of the vehicle.

Though a prepared form of this invention has been illustrated and described it is not intended to be limited thereto, but to include all variations thereof within the spirit and scope defined by the following appended claims.

I claim:

1. A torque arm connection, comprising: a torque arm having an opening in at least one end thereof; an insert rigidly secured within said opening, said insert being made of a rigid, compression-resistant material and having a cavity therein open at its outer end and closed at its inner end, the side wall of said cavity being continuous and barrel-shaped, and the diametrical dimensions at said outer end and said inner end of said cavity being less than the diametrical dimension in the central region of said cavity; and a bolt having a barrel-shaped portion on one end thereof received within said barrel-shaped cavity, said barrel-shaped portion being complementary to and in embraced bearing engagement with the side wall of said barrel-shaped cavity, the longitudinal dimensions of said barrel-shaped cavity and said barrel-shaped end portion being substantially greater than the maximum diametrical dimensions thereof, and the longitudinal axes of said cavity and said end portion lying on the longitudinal axis of said bolt and being normal to said torque arm, said insert being made of at least two parts for assembly about said barrel-shaped end portion, said parts being secured together in mating engagement to provide said continuous cavity side wall.

2. A torque arm connection as defined in claim 1, wherein the exterior of said insert and said torque arm opening are cylindrical and complementary, the exterior of said insert having an enlarged head thereon including a shoulder that abuts against the torque arm to provide a stop means for limiting the insertion of said insert into said opening.

3. A torque arm connection as defined in claim 1, wherein space is provided between the side wall of said barrel-shaped cavity and said barrel-shaped bolt end portion sufficient to allow grease to flow therein, but not so great as to allow any movement between said end portion and said insert other than rotation of said bolt about the longitudinal axis thereof.

4. A torque arm connection as defined in claim 1, wherein the side wall bearing surface of said barrel-shaped cavity is lined with a solid, self-lubricating bearing material.

5. In combination: a vehicle, said vehicle including a longitudinally extending frame; at least one axle disposed beneath said frame and extending transversely thereof; at least one torque arm for connecting said axle to said frame, said torque arm extending generally parallel to the longitudinal axis of said frame; means for connecting one end of said torque arm to said axle, said one end of said torque arm having an opening therein, and said means comprising: an insert rigidly secured within said opening, said insert being made of a rigid, compression-resistant material and having a cavity therein open at its outer end and closed at its inner end, the side wall of said cavity being continuous and barrel-shaped, and the diametrical dimensions at said outer end and said inner end of said cavity being less than the diametrical dimension in the central region of said cavity; and a bolt mounted at one end thereof on said axle and having a barrel-shaped portion on the other end thereof received within said barrel-shaped cavity, said barrel-shaped portion being complementary to and in embraced bearing engagement with the side wall of said barrel-shaped cavity, the longitudinal dimensions of said barrel-shaped cavity and said barrel-shaped end portion being substantially greater than the maximum diametrical dimensions thereof, and the longitudinal axes of said cavity and said end portion lying on the longitudinal axis of said bolt and being normal to said torque arm and to the longitudinal axis of said frame, said insert being made of at least two parts for assembly about said barrel-shaped end portion, said parts being secured together in mating engagement to provide said continuous cavity side wall; and means for connecting the other end of said torque arm to said frame, said last-mentioned means being identical in construction to said means for connecting said one end of said torque arm to said axle.

References Cited by the Examiner

UNITED STATES PATENTS

| | | | |
|---|---|---|---|
| 1,803,257 | 4/1931 | Hufferd | 287—90 |
| 1,809,703 | 6/1931 | Hufferd et al. | 287—90 |
| 2,906,573 | 9/1959 | Runton | 287—90 |
| 2,940,771 | 6/1960 | Hendrickson | 280—104.5 |
| 2,983,555 | 5/1961 | Miller | 308—72 |
| 3,033,589 | 5/1962 | Behnke | 280—104.5 |
| 3,044,798 | 7/1962 | Gerner | 287—93 |

FOREIGN PATENTS 630,181  5/1936  Germany.

CARL W. TOMLIN, *Primary Examiner.*

D. W. AROLA, T. A. LISLE, *Assistant Examiners.*